United States Patent
Serebrin

(10) Patent No.: US 9,495,311 B1
(45) Date of Patent: Nov. 15, 2016

(54) RED ZONE AVOIDANCE FOR USER MODE INTERRUPTS

(71) Applicant: Google Inc., Mountain View, CA (US)

(72) Inventor: Benjamin C. Serebrin, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 328 days.

(21) Appl. No.: 14/199,941

(22) Filed: Mar. 6, 2014

Related U.S. Application Data

(63) Continuation-in-part of application No. 14/109,877, filed on Dec. 17, 2013.

(51) Int. Cl.
*G06F 13/24* (2006.01)
*G06F 13/26* (2006.01)
*G06F 13/32* (2006.01)
*G06F 3/00* (2006.01)
*G06F 5/00* (2006.01)

(52) U.S. Cl.
CPC ..................... *G06F 13/24* (2013.01)

(58) Field of Classification Search
CPC ...................... G06F 13/24; G06F 13/26; G06F 9/4812
USPC .......... 710/260, 261, 263, 264, 266–269, 47
See application file for complete search history.

(56) References Cited

U.S. PATENT DOCUMENTS

| | | | | |
|---|---|---|---|---|
| 4,768,149 A * | 8/1988 | Konopik | ................. | G06F 13/24 710/269 |
| 5,287,523 A * | 2/1994 | Allison | .................. | G06F 13/24 710/50 |
| 5,381,552 A * | 1/1995 | Dahlberg | ................ | G06F 13/26 710/264 |
| 5,388,263 A * | 2/1995 | Ellis | ...................... | G06F 9/4425 712/E9.082 |
| 5,596,755 A * | 1/1997 | Pletcher | ................ | G06F 9/4812 710/261 |
| 5,854,913 A * | 12/1998 | Goetz | ................. | G06F 9/30174 711/207 |
| 5,909,582 A * | 6/1999 | Nakata | .................... | G06F 13/24 710/264 |
| 6,167,425 A * | 12/2000 | Beckhoff | ............. | G06F 9/4887 703/26 |
| 6,378,023 B1 * | 4/2002 | Christie | .................. | G06F 13/24 710/260 |
| 7,707,341 B1 | 4/2010 | Klaiber | | |

(Continued)

OTHER PUBLICATIONS

"Changing from Kernel mode to User mode (and vice versa)," StackExchange, Apr. 11, 2013 [retrieved on Oct. 27, 2015]. Retrieved from the Internet: URL<http://cs.stasckexchange.com/questions/11230/changing-from-kernel-mode-to-user-mode-and-vice-versa/2#2>, 2 pages.

(Continued)

*Primary Examiner* — Faisal M Zaman
(74) *Attorney, Agent, or Firm* — Fish & Richardson P.C.

(57) ABSTRACT

A method includes for each processed interrupt: determining whether the interrupt is a user mode interrupt; upon determining that the interrupt is a user mode interrupt, determining a stack location to insert an entry corresponding to the user mode interrupt, the stack location being calculated by adjusting a current stack pointer by a red zone offset; and inserting the entry corresponding to the user mode interrupt into the stack at the stack location.

20 Claims, 7 Drawing Sheets

(56) References Cited

U.S. PATENT DOCUMENTS

| | | | | |
|---|---|---|---|---|
| 7,870,541 | B1* | 1/2011 | Deshpande | G06F 9/4425 717/124 |
| 2002/0019902 | A1* | 2/2002 | Christie | G06F 9/30036 710/260 |
| 2004/0153906 | A1* | 8/2004 | Kusumoto | G06F 9/445 714/710 |
| 2005/0149711 | A1* | 7/2005 | Zimmer | G06F 9/4812 712/244 |
| 2005/0154813 | A1* | 7/2005 | DeWitt | G06F 13/24 710/260 |
| 2007/0136403 | A1* | 6/2007 | Kasuya | G06F 9/461 |
| 2009/0259846 | A1* | 10/2009 | Watt | G06F 9/4812 713/166 |
| 2010/0293342 | A1* | 11/2010 | Morfey | G06F 9/30032 711/154 |
| 2011/0040915 | A1* | 2/2011 | Strauss | G06F 9/4818 710/267 |
| 2012/0036341 | A1* | 2/2012 | Morfey | G06F 12/1491 712/229 |

OTHER PUBLICATIONS

Corbet, "Handling interrupts in user space," LWN.net, Mar. 15, 2005 [retrieved on Oct. 27, 2015]. Retrieved from the Internet: URL<https://lwn.net/Articles/127698/>, 4 pages.

Yang, "W4118 Operating Systems," Columbia University, Course Powepoint, Spring 2009, 18 pages.

* cited by examiner

RED ZONE AVOIDANCE FOR USER MODE INTERRUPTS

CROSS REFERENCE TO RELATED APPLICATIONS

This application is a continuation-in-part of U.S. patent application Ser. No. 14/109,877, filed Dec. 17, 2013, which is hereby incorporated by reference.

BACKGROUND

This specification relates to techniques for providing user mode interrupts from a processor.

Modern processors may include multiple independent processor cores. Each processor core may execute one or more threads at a time. The processor core may be configured to process interrupts from various resources and deliver the interrupts to the currently executing threads. When an interrupt is received from a resource, the processor core may inject the interrupt into the currently executing thread by calling a function that has been configured to receive the interrupt within the code executing in the thread. Execution of the thread will thus be interrupted so that the function can be called to process the interrupt.

SUMMARY

The subject matter of this application relates to techniques for providing user mode interrupts from a processor.

In general, one innovative aspect of the subject matter described in this specification can be embodied in methods that include the actions of processing interrupts, and for each interrupt: determining whether the interrupt is a user mode interrupt; upon determining that the interrupt is a user mode interrupt, determining a stack location to insert an entry corresponding to the user mode interrupt, the stack location being calculated by adjusting a current stack pointer by a red zone offset; and inserting the entry corresponding to the user mode interrupt into the stack at the stack location.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. By sending interrupts directly to user mode programs for processing, increased performance may be realized versus previous techniques. Further, the present techniques avoid giving operating system level privileges to user mode programs during interrupt processing.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

In modern computer systems, latency-sensitive operations may be handled by both operating system programs and user programs. For example, a user program may require direct notification when low latency device resources (e.g., Network Interface Cards (NICs), flash storage, etc.) signal the completion of a request. Such direct notification may be necessary to quickly react to the completion and thus fully take advantage of such high-speed device resources. Current techniques partially allow for user programs to receive interrupts, but require that the interrupts be mediated by the operating system, which leads to poor performance. Further, a solution built with current hardware may require user program to be given too much privilege to be able to provide proper isolation, and may contain destructive race conditions.

Accordingly, the present disclosure describes various implementations for allowing user programs (e.g., user mode code) to receive and process interrupts. In one example, a method includes for each interrupt received by a processor, associating the interrupt with a first interrupt number. A determination is then made that the interrupt is designated as a special interrupt, such as, for example, by consulting a special interrupt register. A current execution mode for the processor is then determined. For each interrupt for which the current execution mode is determined to be an operating system mode, the interrupt is delivered (e.g., to the operating system) as the first interrupt number. For each interrupt for which the current execution mode is determined to be a user mode, the first interrupt number is translated to a second interrupt number, and the interrupt is delivered (e.g., to the currently running user program) as the second interrupt number.

Figure 1:
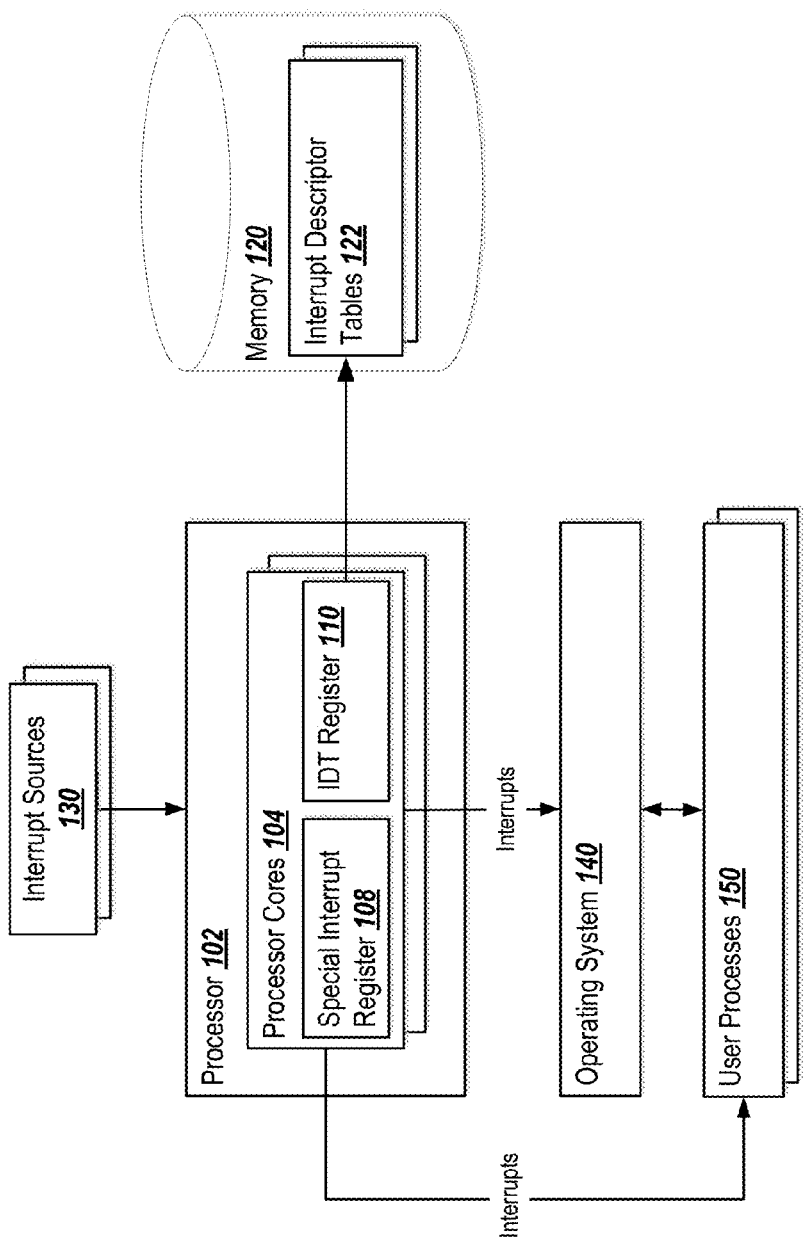
FIG. 1 is a block diagram of an environment in which user mode interrupts can be implemented.

FIG. 1 is a block diagram of an environment in which user mode interrupts are implemented. As shown, environment 100 includes a processor 102 including one or more processor cores 104. The processor 102 communicates with one or more interrupt sources 130, a memory 120, an operating system 140, and one or more user processes 150. Each of the processor cores 104 includes a special interrupt register 108, and an interrupt descriptor table (IDT) register 110. The interrupt descriptor table register 110 includes a location pointing to one of the one or more interrupt descriptor tables 122 stored in the memory 120.

In operation, the processor core 104 detects interrupts generated by the one or more interrupt sources 130. The processor core 104 may then associate the interrupt with a particular interrupt number. Processor core 104 may then consult the special interrupt register 108 to determine whether to translate the interrupt number into different interrupt number for delivery to one of the user processes

150. If such a translation is configured, the processor core 104 determines its current execution mode. If the current execution mode is a user mode, the interrupt number may be translated into a different interrupt number, and the interrupt may be delivered to one of the user processes 150 by consulting the interrupt descriptor table 122 to determine the address of an interrupt handler for the new interrupt number. If the processor core 104 is currently executing in an operating system mode, the processor core 104 delivers the interrupt to the operating system 140 with the original interrupt number.

As shown, the environment 100 includes a processor 102. In some implementations, the processor 102 may be an x86 compatible processor, such as those manufactured by INTEL, AMD, or other manufacturers. The processor 102 may operate in different operating modes, including, but not limited to, real mode, virtual x86 mode, 16-bit mode, 32-bit mode, compatibility mode, long mode, and 64-bit mode. The processor 102 may also be another type of processor, including, but not limited to, ARM, QUALCOMM SNAPDRAGON, IBM POWER, XILINX MICROBLAZE, or other types of processors. In some implementations, the environment 100 may include two or more processors 102.

The processor 102 includes one or more processor cores 104. In some implementations, each of the processor cores 104 may be capable of executing one or more threads of execution. The processor cores 104 may execute these threads simultaneously with one another. In some implementations, the processor 102, the processor cores 104, or both components may include integrated storage for caching data. The processor 102 or the processor cores 104 may also include microcode including instructions defining the behavior of the components.

As shown, each of the processor cores 104 includes a special interrupt register 108. The special interrupt register 108 indicates to the processor core 104 whether an interrupt should be translated to a different interrupt number for presentation to a user process 150 while the processor core 104 is running in user mode. For example, the special interrupt register 108 may include an interrupt number to compare to a current interrupt to determine whether to translate the interrupt number. The special interrupt register 108 may also include an interrupt number to translate the interrupt to if the comparison is successful. In some implementations, each processor core 104 may include multiple special interrupt registers 108, such that the interrupt translation behavior may be performed for multiple interrupt numbers per hardware thread.

In some implementations, the special register 108 may include a pure instruction address, allowing the processor core 104 to fetch instructions directly without dependence on subsequent memory accesses. For example, in a 64-bit execution mode, the code segment base for processor core 104 may always be 0, so the pure instruction address is directly usable by the processor core 104. In non-64-bit modes, the code segment base may be forced to zero when the processor core 104 jumps to a user instruction. In some cases, the special register 108 is similar to a standard SYSCALL instruction, but entering into user mode.

In another example, the special register 108 may include a value including a special interrupt number and an interrupt handler address. Incoming interrupts may be checked against the special interrupt number. If an interrupt matches the special interrupt number, the interrupt is delivered to the interrupt handler address. In some implementations, the interrupt handler address in the special register 108 may be an address of an interrupt handler functions within a user process currently executing on the processor core 104. In some cases, the interrupt may be delivered to the interrupt handler address without performing the translation of the interrupt number, as the subsequent lookup into the interrupt descriptor table to retrieve the interrupt handler address is no longer necessary.

Each of the processor cores 104 also includes an interrupt descriptor table register 110. The interrupt descriptor table register 110 may include a memory address within the memory 120 at which a current interrupt descriptor table 122 may be found. In operation, the processor core 104 may consult this register to determine where in the memory its current interrupt descriptor table 122 is located. The processor core 104 may then read from the interrupt descriptor table 122 to determine how to process a particular interrupt. In some implementations, the operating system 140 may update the interrupt descriptor table register 110 to swap between different interrupt descriptor tables 122. In some cases, the operating system 140 does not update interrupt descriptor table register 110, and changing between interrupt descriptor table entries is performed by updating a page table base address register (e.g., CR3) to point to a page table that maps the interrupt descriptor table's virtual addresses to alternate physical addresses with differing interrupt descriptor table contents.

The environment 100 also includes a memory 120 or multiple memories 120. The memory 120 may include any type of memory or database module and may take the form of volatile and/or non-volatile memory including, without limitation, magnetic media, optical media, random access memory (RAM), read-only memory (ROM), removable media, or any other suitable local or remote memory component. The memory 120 may also include cache memory integrated into the processor 102 or the processor cores 104.

The memory 120 includes one or more interrupt descriptor tables 122. In some implementations, the interrupt descriptor tables 122 include mappings from interrupt numbers to interrupt handler functions. The interrupt handler functions may be stored as memory addresses within the table. When an interrupt associated with particular interrupt number is received, the processor core 104 may consult the interrupt descriptor table 122 to determine the address of the appropriate interrupt handler to call to handle the interrupt. In some cases, a single interrupt descriptor table 122 is used and a single pointer is multiplexed for the user-gate interrupt selection on a context switch.

As shown, the environment also includes one or more interrupt sources 130. The interrupt sources 130 may be hardware or software devices that communicate with the processor 102 by sending indications that certain events have occurred in the form of interrupts. In some implementations, the interrupt sources 130 may include flash storage devices, solid-state drives (SSDs), Network Interface Cards (NICs), Random Access Memory (RAM), or other devices. In some implementations, the interrupt sources 130 may communicate with the processor via a data transmission link, such as, for example a bus, a bridge, or another type of link.

The environment 100 also includes an operating system 140. In some implementations, the operating system 140 may be a commercial or open source operating system executing on the processor 102. In some implementations, the operating system may be GOOGLE ANDROID, GOOGLE CHROMEOS, or other operating systems. In operation, the operating system 140 may receive interrupts from the one or more processor cores 104 at an entry point defined in the interrupt descriptor table 122. For example, the processor core 104 may call an interrupt handler function within the operating system 140 at a memory address stored in the interrupt descriptor table 122 in response to receiving a particular interrupt while the processor core 104 is in an operating system mode.

The environment 100 also includes one or more user processes 150. The user processes 150 may be user mode programs executing on the one or more processor cores 104 at the direction of the operating system 140. In some implementations, the user processes 150 may include multiple threads of execution executing on the processor cores 104. The user processes 150 may receive interrupts from the processor cores 104 at entry points defined within the interrupt descriptor tables 122. For example, the processor core 104 may receive a particular interrupt while executing a user process 150 in user mode. Processor core 104 may translate the interrupt to a different interrupt number and may consult the interrupt descriptor table 122 for the address of an interrupt handler function associated with the new interrupt number. The processor core 104 may then call the interrupt handler at this memory location to deliver the interrupt to the user process 150.

In some implementations, the translation between interrupt numbers may be performed by a virtual machine architecture, either instead of or in cooperation with the processor cores 104.

Figure 2:
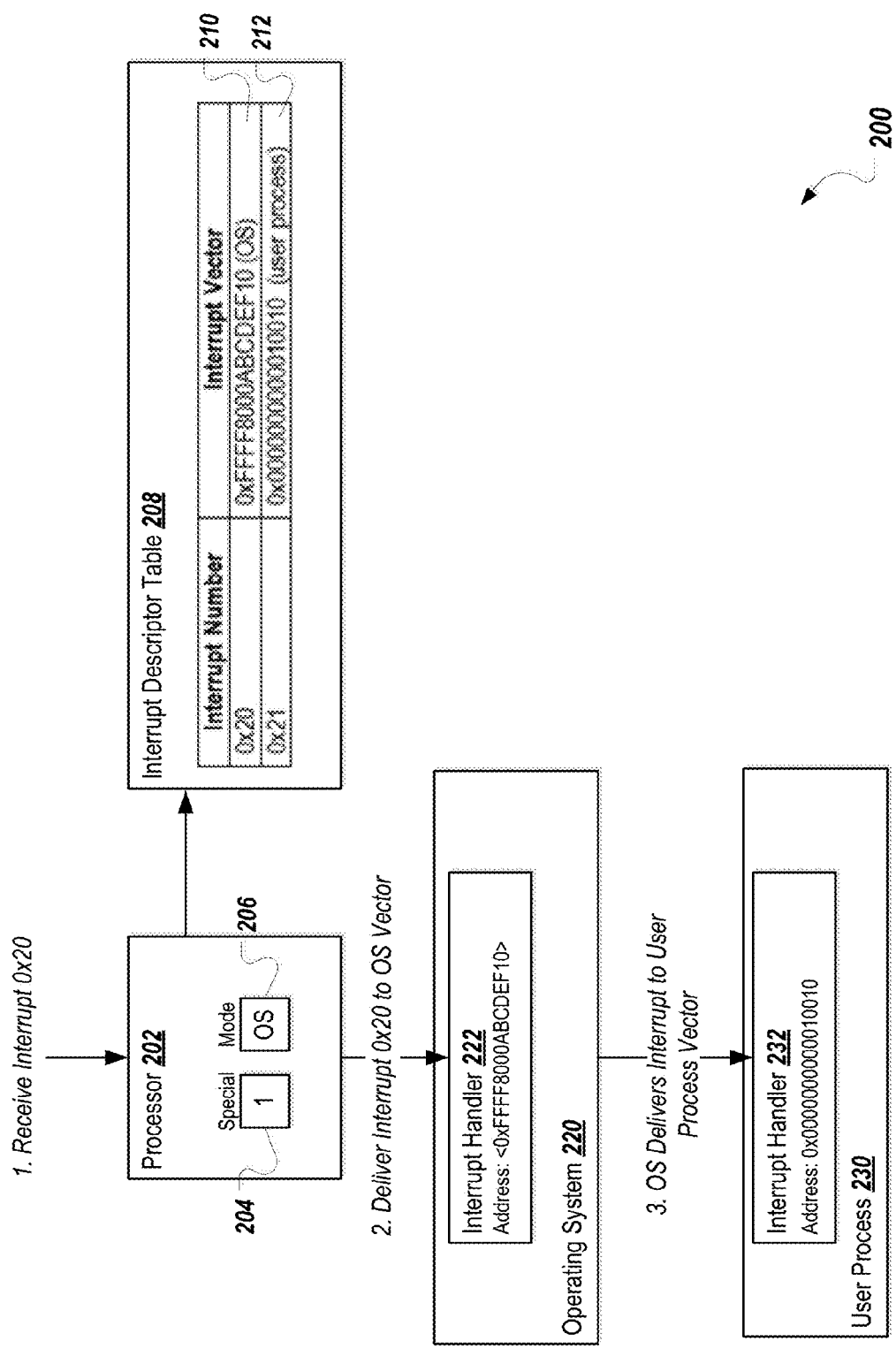
FIG. 2 is a diagram of an example interaction showing an interrupt being delivered to an operating system when a processor is in operating system (OS) mode.

FIG. 2 is a diagram of an example interaction showing an interrupt being delivered to an operating system when a processor is in operating system (OS) mode. As shown, the processor 202 receives interrupt 0x20. In some implementations, the processor 202 is the same as the processor 102 described relative FIG. 1. The processor 202 may receive the interrupt from an interrupt source, such as the interrupt sources 130 described relative FIG. 1. The processor 202 includes a special interrupt register 204 set to a value of one, and an execution mode indicator 206 set to a value of "OS," indicating that the processor 202 is executing in operating system mode.

The processor 202 consults an interrupt descriptor table 208 to determine how to handle the received interrupt. Because the processor 202 is currently executing in operating system mode, the processor 202 does not translate the interrupt number, and reads the address of the interrupt handler associated with interrupt number 0x20 from the interrupt descriptor table 208 at row 210. The processor 202 then delivers the interrupt to operating system 220 by calling interrupt handler 222. As shown, the interrupt handler 222 is located at the address stored in the interrupt descriptor table 208 at row 210. After receiving the interrupt, the operating system 220 delivers the interrupt to user process 230 by calling interrupt handler 232.

Figure 3:
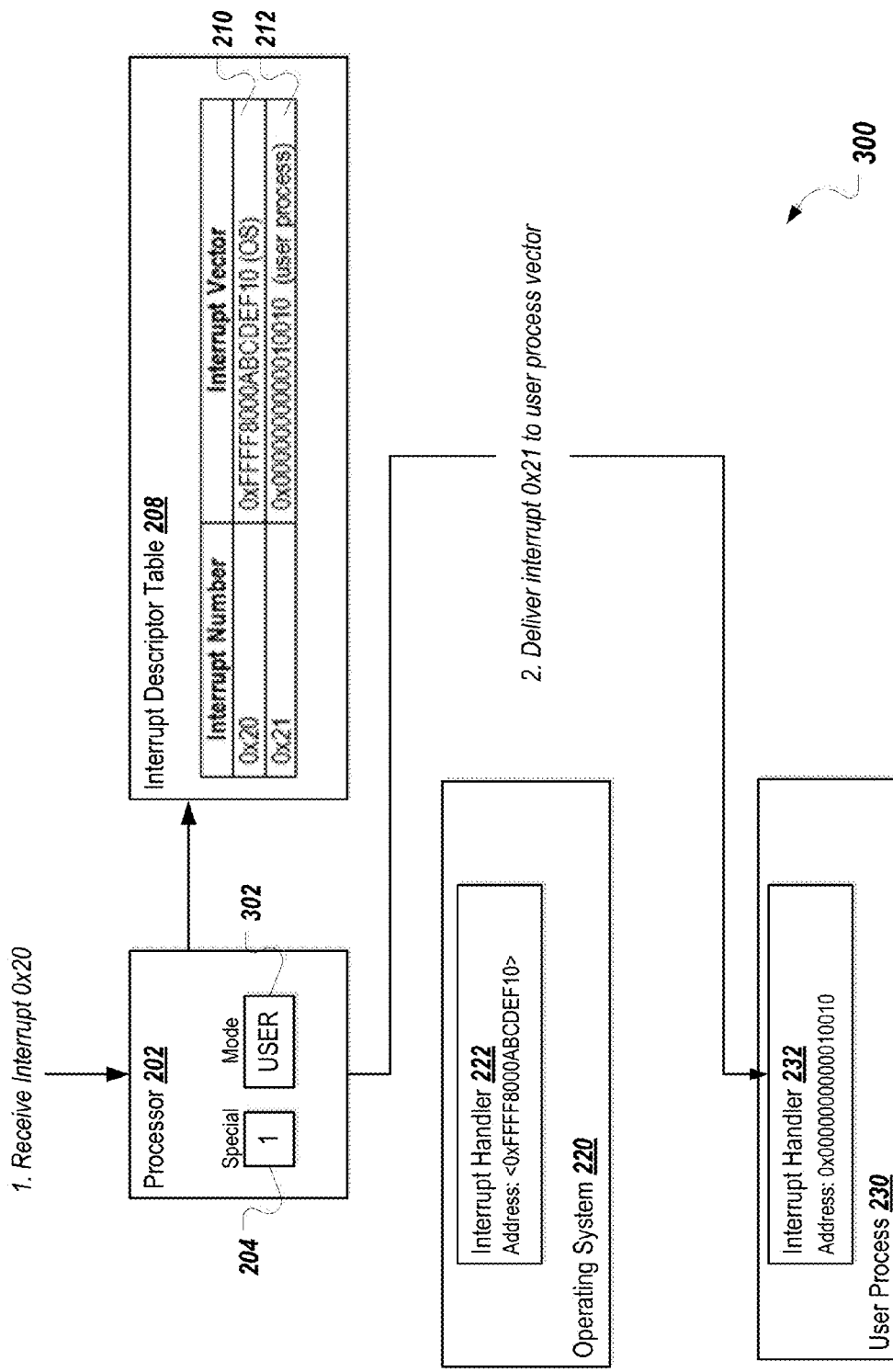
FIG. 3 is a diagram of an example interaction showing an interrupt being translated and delivered to a user process when a processor is in user mode.

FIG. 3 is a diagram of an example interaction showing an interrupt being translated and delivered to a user process when a processor is in user mode. As shown, the processor 202 receives interrupt 0x20. The special register 204 includes a value of one, indicating that interrupt translation is enabled. The execution mode indicator 302 now indicates that the processor 202 is executing in user mode. Accordingly, the processor 202 performs a translation on interrupt 0x20, in this case translating the interrupt 0x20 to interrupt 0x21. The processor 202 reads the address for the interrupt handler corresponding to interrupt 0x21 from row 212 of the interrupt descriptor table 208. The processor 202 then delivers the translated interrupt 0x21 to user process 230 by calling interrupt handler 232. The interrupt handler 232 is located at the address stored in the interrupt descriptor table for interrupt number 0x21.

Figure 4:
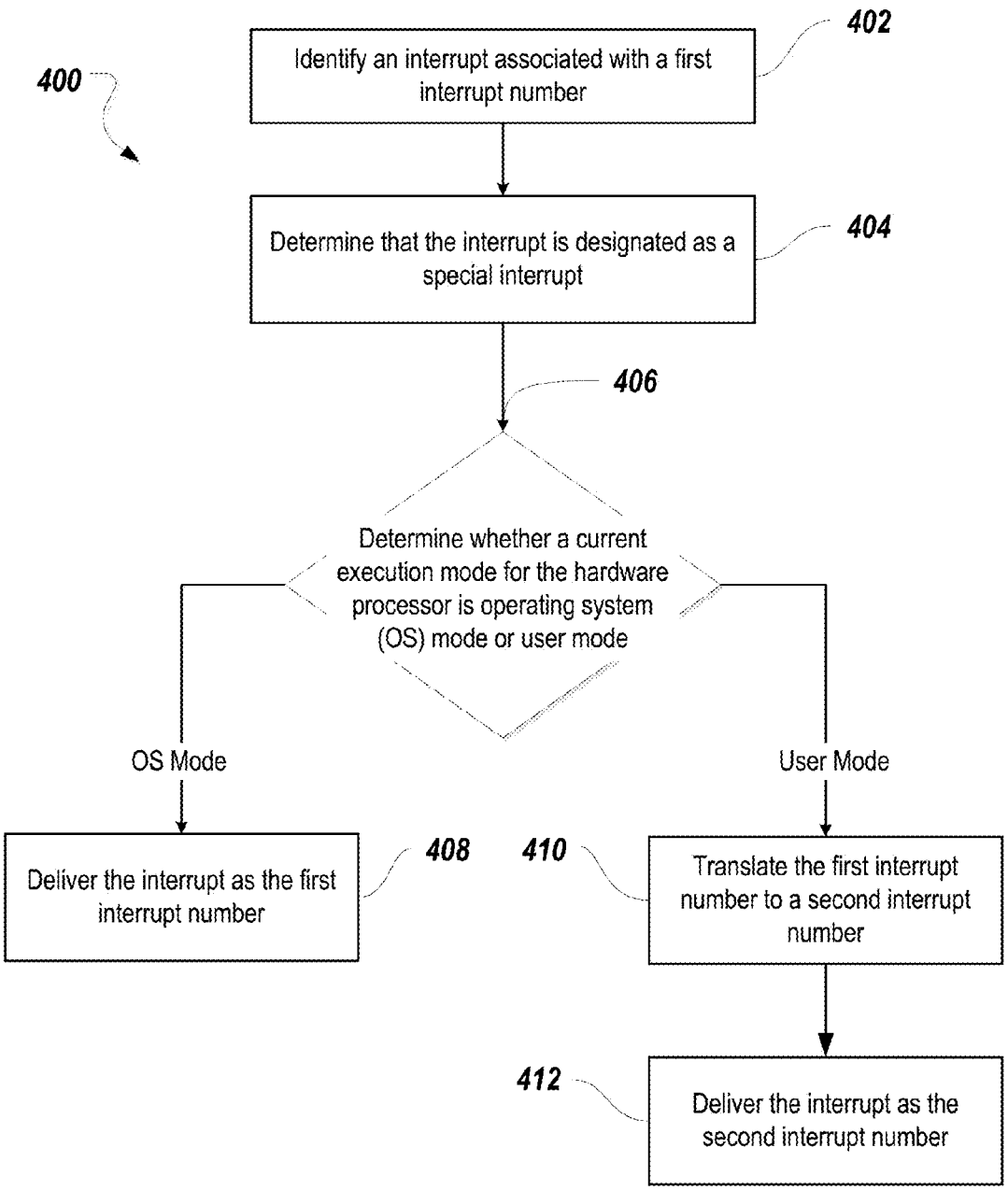
FIG. 4 is a flow diagram of an example process for providing user mode interrupts.

FIG. 4 is a flow diagram of an example process for providing user mode interrupts. At 402, an interrupt associated with the first interrupt number is identified. At 404, a determination is made that the interrupt is designated as a special interrupt. In some implementations, determining that the interrupt is designated as a special interrupt includes examining a register indicating that the interrupt is designated as a special interrupt. In some cases, a special interrupt being an interrupt to be translated to a different interrupt number if the hardware processor is in user mode.

At 406, a determination is made whether a current execution mode for the hardware processor is an operating system mode or a user mode. If the current execution mode is operating system mode, the interrupt is delivered as the first interrupt number (408). In some implementations, the interrupt is delivered to an operating system executing on the hardware processor.

If the current execution mode is user mode, the method 400 continues to 410, where the first interrupt number is translated to a second interrupt number. At 412, the interrupt is delivered as a second interrupt number. In some implementations, the interrupt is delivered to a user process executing on the hardware processor. The interrupt may be delivered to an interrupt vector associated with the second interrupt number in an interrupt descriptor table (IDT) entry associated with the user process. In some cases, delivering the interrupt to the user process does not include delivering the interrupt to the operating system.

In some cases, the method 400 includes performing a context switch from the first user process to a second user process different than the first user process, and identifying a second IDT entry associated with the second user process upon performing the context switch. The method 400 may also include identifying a second interrupt associated with the first interrupt number after performing the context switch, and delivering the interrupt to a second interrupt vector associated with the second interrupt number in the second IDT entry associated with the second user process. In some cases, performing the context switch does not include updating an IDT base register.

In some implementations, an interrupt gate may be used to specify the instruction address of the interrupt handler, and the desired mode (OS or user) in which the interrupt handler should be run. In some cases, the IDT may be placed in a page within memory that is mapped to different memory contents for each user process. In such a case, switching the page table base register (e.g., CR3) causes an IDT change implicitly with the page table change, with no additional processor state change. In some implementations, the operating system may be responsible for migrating the interrupt from core to core, for example by using VT-d interrupt remapping or MSI(-x) vector rewriting.

In some implementations, the OS will set Eflags.IOPL to 0 for the interrupt descriptor table entry, which causes Eflags.IF to not be cleared when the interrupt is delivered to user mode. This prevents the user from masking hardware interrupts. The device itself may self-mask interrupts such that it does not deliver interrupts at an excessive rate. More generally, the system is configured to allow interrupts to be delivered to the user code without masking other interrupts.

The operating system may disable the special interrupt mechanism when switching to another thread, which may have its own special interrupt number assigned.

In some implementations, the method 400 includes processing additional interrupts without waiting for an End of Interrupt (EOI) indication from the user process after delivering the interrupt as the second interrupt number. In such a case, the step of setting the Interrupt Sent Register (ISR) bit with an Advanced Programmable Interrupt Controller (APIC) may be skipped, obviating the need for an explicit EOI indication from the user process. In some cases, the APIC may include a configuration bit vector enabling or disabling this behavior for each interrupt.

The method 400 may also include receiving an End of Interrupt (EOI) indication from the user process indicating that the user process has finished processing the interrupt after delivering the interrupt as the second interrupt number. In some implementation, an APIC may include a special EOI instruction accessible by the user process. In some cases, the processor may generate an EOI for the user process to the APIC as part of delivering the interrupt. Such a case may eliminate the need for a design change to the processor or APIC and may be implemented in microcode.

In some implementations, it may be necessary to take into account and preserve a "red zone" area within the execution stack when processing a user mode interrupt. For example, some application binary interfaces (ABIs) reserve an area beyond the location of the current stack pointer for use by the current context. This area is sometimes referred to as a "scratch pad," because the current function context may use it to store any data that is not needed across function calls. When the current function calls another function, the stack is modified and any data stored in the red zone is no longer valid. However, as long as the current function does not call another function, it is guaranteed that any data it stores in the red zone will not be modified or overwritten. Accordingly, signal handlers, interrupt handlers, or other asynchronous constructs that may pre-empt execution of a function must preserve the red zone area so, when the function resumes, its data will still be available.

The purpose of this red zone functionality is to allow a process a space on the stack to store data without explicitly moving the stack pointer. Not having to update the stack pointer for every modification to the red zone may increase performance, as it saves an operation each time the red zone is modified. In some cases, the size of the red zone may be configurable, such as by a global parameter, a parameter associated with a particular process, a parameter associated with a particular user, or the size may be dynamically changed during execution of a process, such as by the operating system or by the process itself.

The user mode interrupt functionality described herein may be implemented such that an entry is pushed on to the stack to represent the call of a user mode function called to handle the interrupt. However, since this interrupt handler call is a user space function, by default it will not respect the red zone area of the previous function context, and the pushing of the entry associated with the interrupt handler call will not respect the red zone area. As previously discussed, user space function calls, which are generally called by other functions, do not have to respect the red zone of the calling context. Since the user mode interrupt handler function is actually pre-empting execution of the previous function context, it adopts the behavior of other asynchronous constructs, and refrains from modifying the red zone area.

Figure 5A:
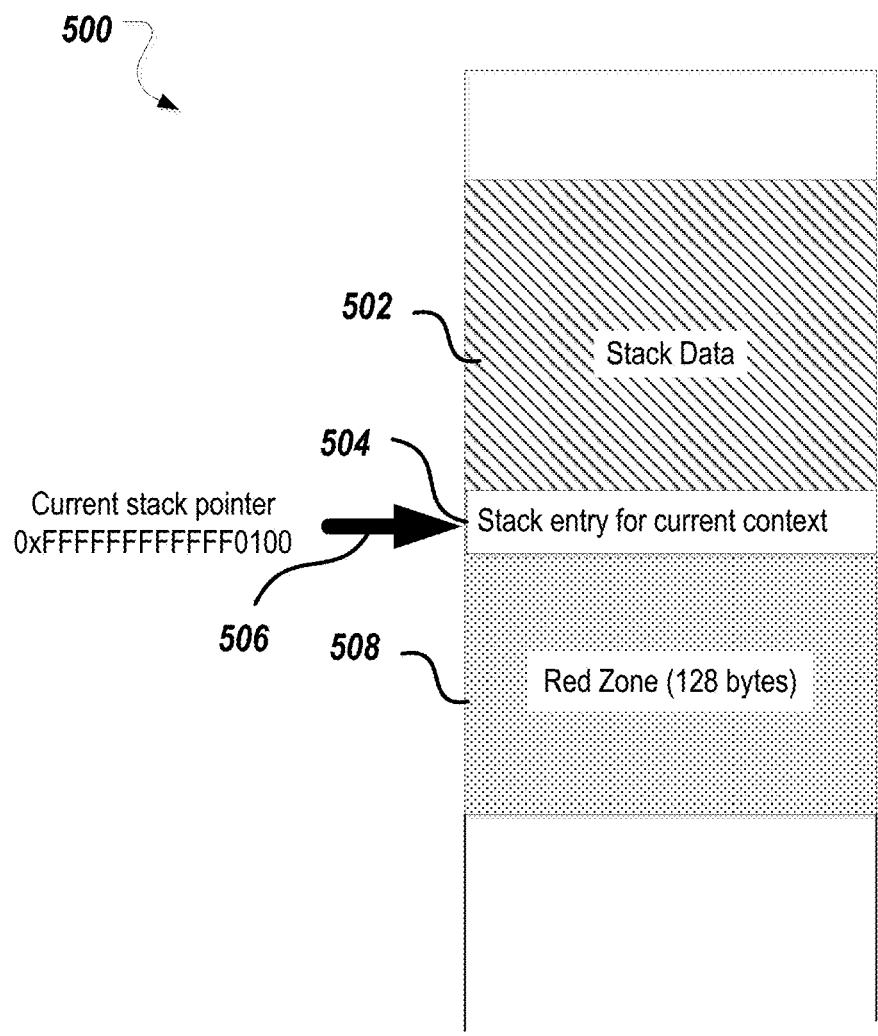
FIG. 5A shows an execution stack prior to the occurrence of a user mode interrupt.
Figure 5B:
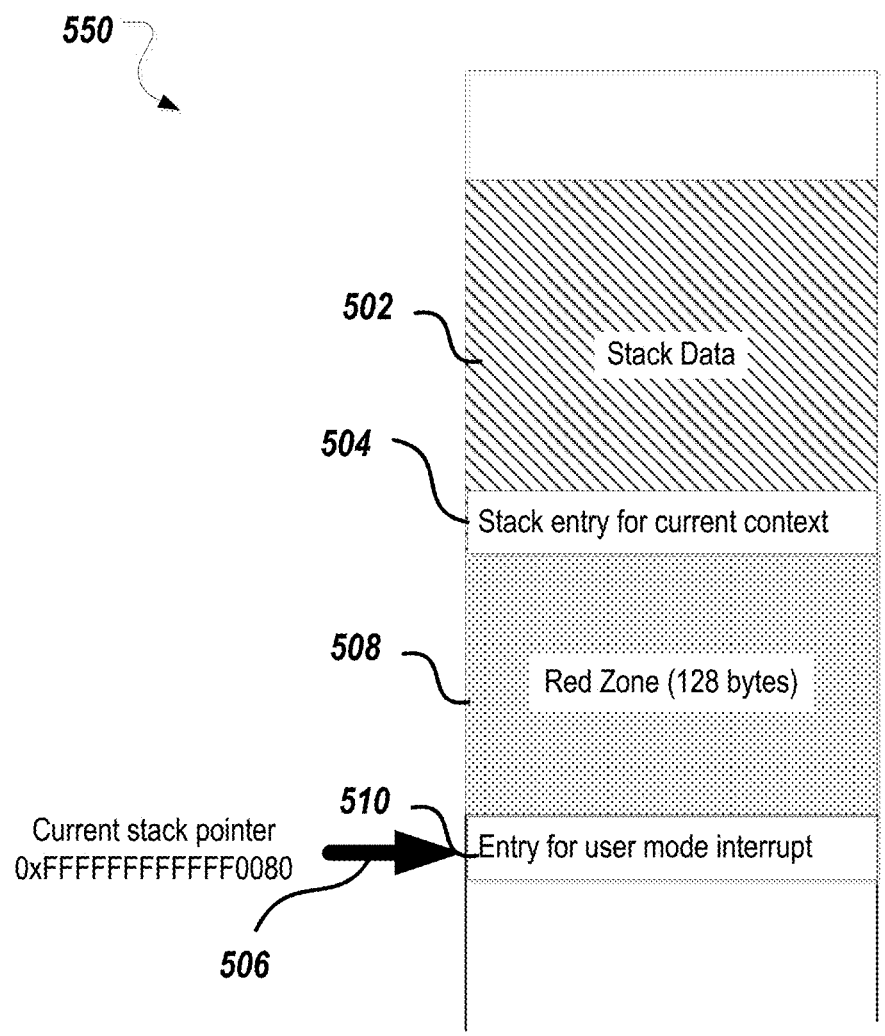
FIG. 5B shows the execution stack modified in response to a user mode interrupt.

FIGS. 5A and 5B illustrate this process. FIG. 5A shows an execution stack 500 prior to the occurrence of a user mode interrupt. As shown, the execution stack 500 includes a region of stack data 502 including a stack entry 504 associated with a current program context. For example, the stack entry may include an address of the current function, parameters passed to the current function, or other information associated with the current program context. A current stack pointer 506 points to the address of the stack entry 504 (e.g., 0xFFFFFFFFFFFF0100). The current stack pointer 506 represents the address of the stack entry associated with the current execution context, and is used to determine the location on the stack at which new stack entries, such as those associated with user mode function calls, should be inserted. For example, if the current function were to call a sub function, the current function would insert stack entries associated with the sub function at a location immediately after the current stack pointer 506, and update the current stack pointer 506 to point to this new location.

The execution stack 500 also includes a red zone area 508. As previously discussed, the red zone area 508 may be used by the current function to store data without updating the current stack pointer 506. For example, the current function may store values related to its execution in the red zone 508, and may be assured that these values will not be modified unless the current function calls a sub function. Although the red zone area 508 shown to have a size of 128 bytes, in some implementations the red zone area 508 may be smaller or larger, or may be omitted entirely.

FIG. 5B shows an execution stack 550 illustrating how the execution stack 500 may be modified in response to a user mode interrupt. As shown, the stack data region 502, the current stack entry 504, and the red zone area 508 are unchanged relative to FIG. 5A. A user mode interrupt stack entry 510 has been inserted into the execution stack 550 after the red zone area 508. In some cases, the user mode interrupt stack entry 510 may include multiple fields, including an old stack pointer, an old instruction pointer, arithmetic flags, function arguments, and other fields. As shown, the current stack pointer 506 has been updated to point to the user mode interrupt stack entry 510. By inserting the user mode interrupt stack entry 510 after the red zone area 508, any data stored in the red zone area 508 by the current function that was preempted by the user mode interrupt will be preserved for when the current function resumes. When the user mode interrupt handler finishes executing, the current stack pointer 506 is updated to point to the current stack entry 504, and execution of the current function is resumed.

Figure 6:
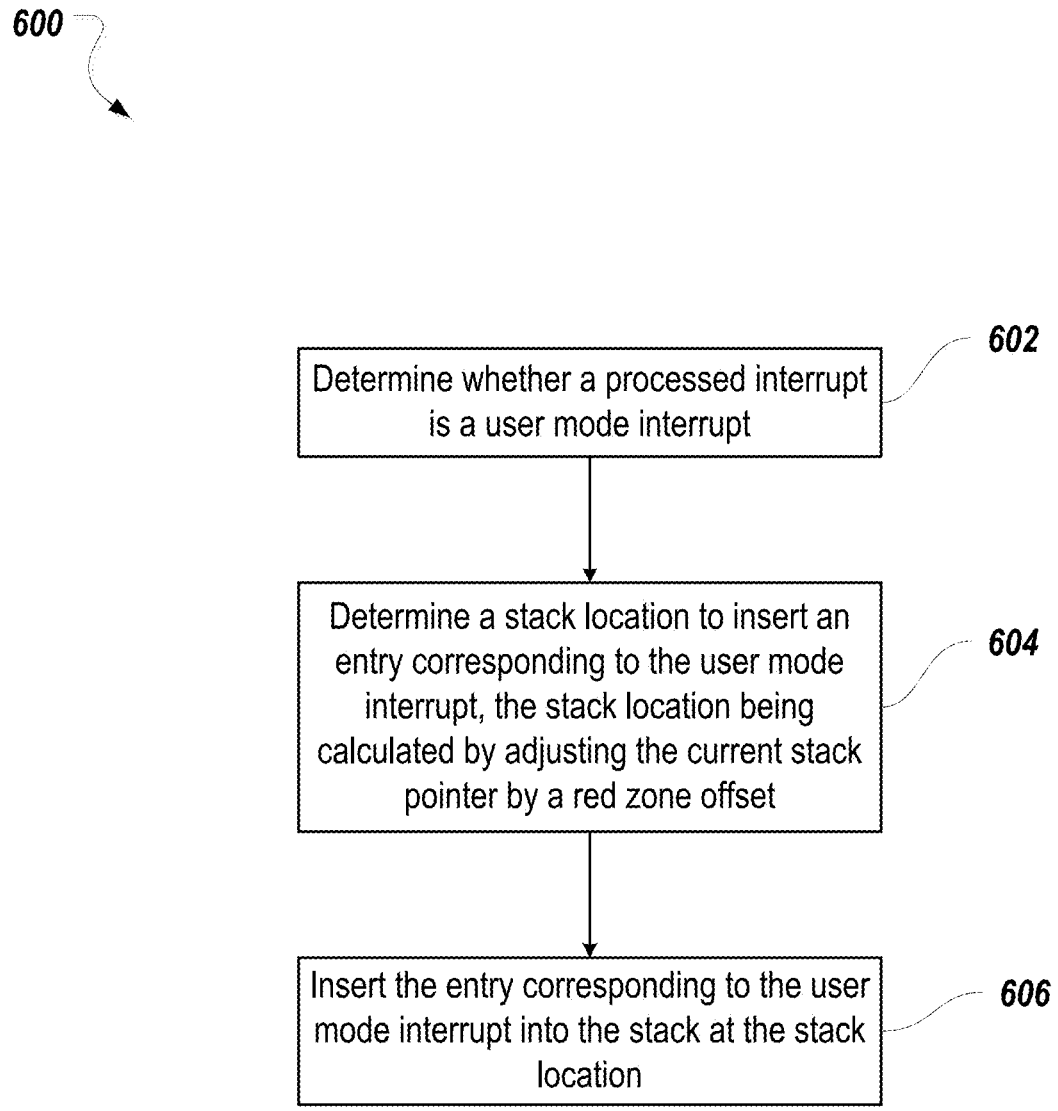
FIG. 6 is a flowchart illustrating an example method for managing an execution stack during user mode interrupt processing Like reference numbers and designations in the various drawings indicate like elements.

FIG. 6 is a flowchart illustrating an example method 600 for managing an execution stack during user mode interrupt processing. At 602, a determination is made whether a processed interrupt is a user mode interrupt.

At 604, a stack location is determined at which to insert an entry corresponding to the user mode interrupt. In some cases, the stack location may be calculated by adjusting a current stack pointer by a red zone offset. For example, as shown in FIGS. 5A and 5B, the current stack pointer 506 is decremented by the size of the red zone area 508 (e.g., 128 bytes). This results in the value of the current stack pointer 506 being updated from 0xFFFFFFFFFFFF0100 to 0xFFFFFFFFFFFF00080 (subtracting 128). In some implementations, the red zone offset may be a static value.

At 606, the entry corresponding to the user mode interrupt is inserted into the stack at the stack location. For example, as shown in FIG. 5B, the user mode interrupt entry 510 is inserted into the stack after the red zone area 508.

In some cases, the red zone offset may be dynamically determined before determining the stack location to insert the entry corresponding to the user mode interrupt. Dynamically determining the red zone offset may be performed based at least in part on a currently executing process, a global configuration setting, a value stored in an E_FLAGS register, a user setting, a new XSAVE region controlled by the user, or other factors.

In some implementations, a user mode interrupt handler may be executed after inserting the entry corresponding to the user mode interrupt into the stack at the stack location. After completing execution of the user mode interrupt handler, the entry corresponding to the user mode interrupt may be removed from the stack, and the current stack pointer may be restored.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a transmission link for receipt by the second device, but may not include the second device receiving the data. Conversely, "receiving" from a first device may include receiving the data from a transmission link, but may not include the first device transmitting the data.

"Determining" by a computing system can include the computing system requesting that another device perform the determination and supply the results to the computing system.

Embodiments of the subject matter and the operations described in this specification can be implemented in digital electronic circuitry, or in computer software, firmware, or hardware, including the structures disclosed in this specification and their structural equivalents, or in combinations of one or more of them.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and optical disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by a hardware processor, the method comprising:
  processing interrupts, and for each interrupt:
    determining whether the interrupt is a user mode interrupt;
    in response to determining that the interrupt is a user mode interrupt, determining a stack location to insert an entry corresponding to the user mode interrupt, the stack location being calculated by adjusting a current stack pointer, pointing to an address of a stack entry associated with a current program context, by a red zone offset; and
    inserting the entry corresponding to the user mode interrupt into the stack at the stack location calculated by adjusting the current stack pointer by the red zone offset.

2. The method of claim 1, wherein the red zone offset is static.

3. The method of claim 1, further comprising dynamically determining the red zone offset before determining the stack location to insert the entry corresponding to the user mode interrupt.

4. The method of claim 3, wherein the red zone offset is determined based at least in part on a currently executing process.

5. The method of claim 3, wherein the red zone offset is determined based at least in part on a global configuration setting.

6. The method of claim 3, wherein the red zone offset is determined based at least in part on a user setting.

7. The method of claim 3, wherein the red zone offset is determined based at least in part on a value stored in an E_FLAGS register.

8. The method of claim 1, further comprising:
  executing a user mode interrupt handler after inserting the entry corresponding to the user mode interrupt into the stack at the stack location;
  removing the entry corresponding to the user mode interrupt from the stack after completing execution of the user mode interrupt handler; and
  restoring the current stack pointer after completing execution of the user mode interrupt handler.

9. A non-transitory, computer-readable medium storing instructions operable when executed to cause at least one processor to perform operations comprising:
  processing interrupts, and for each interrupt:
    determining whether the interrupt is a user mode interrupt;
    in response to determining that the interrupt is a user mode interrupt, determining a stack location to insert an entry corresponding to the user mode interrupt, the stack location being calculated by adjusting a current stack pointer, pointing to an address of a stack entry associated with a current program context, by a red zone offset; and
    inserting the entry corresponding to the user mode interrupt into the stack at the stack location calculated by adjusting the current stack pointer by the red zone offset.

10. The computer-readable medium of claim 9, wherein the red zone offset is static.

11. The computer-readable medium of claim 9, further comprising dynamically determining the red zone offset before determining the stack location to insert the entry corresponding to the user mode interrupt.

12. The computer-readable medium of claim 11, wherein the red zone offset is determined based at least in part on a currently executing process.

13. The computer-readable medium of claim 11, wherein the red zone offset is determined based at least in part on a global configuration setting.

14. The computer-readable medium of claim 11, wherein the red zone offset is determined based at least in part on a user setting.

15. The computer-readable medium of claim 11, wherein the red zone offset is determined based at least in part on a value stored in an E_FLAGS register.

16. The computer-readable medium of claim 9, the operations further comprising:
  executing a user mode interrupt handler after inserting the entry corresponding to the user mode interrupt into the stack at the stack location;
  removing the entry corresponding to the user mode interrupt from the stack after completing execution of the user mode interrupt handler; and
  restoring the current stack pointer after completing execution of the user mode interrupt handler.

17. A system comprising:
  memory for storing data; and
  one or more processors operable to perform operations comprising:
    processing interrupts, and for each interrupt:
      determining whether the interrupt is a user mode interrupt;
      in response to determining that the interrupt is a user mode interrupt, determining a stack location to insert an entry corresponding to the user mode interrupt, the stack location being calculated by adjusting a current stack pointer, pointing to an address of a stack entry associated with a current program context, by a red zone offset; and
      inserting the entry corresponding to the user mode interrupt into the stack at the stack location calculated by adjusting the current stack pointer by the red zone offset.

18. The system of claim 17, wherein the red zone offset is static.

19. The system of claim 17, the operations further comprising dynamically determining the red zone offset before determining the stack location to insert the entry corresponding to the user mode interrupt.

20. The system of claim 17, wherein the red zone offset is determined based at least in part on a currently executing process.

* * * * *